US009596207B1

(12) United States Patent
Lin et al.

(10) Patent No.: US 9,596,207 B1
(45) Date of Patent: Mar. 14, 2017

(54) BOOTSTRAP SOCIAL NETWORK USING EVENT-RELATED RECORDS

(71) Applicant: Google Inc., Mountain View, CA (US)

(72) Inventors: Jennifer W. Lin, San Jose, CA (US); Ping Wu, Saratoga, CA (US)

(73) Assignee: Google Inc., Mountain View, CA (US)

(*) Notice: Subject to any disclaimer, the term of this patent is extended or adjusted under 35 U.S.C. 154(b) by 305 days.

(21) Appl. No.: 13/731,359

(22) Filed: Dec. 31, 2012

(51) Int. Cl.
*G06Q 50/10* (2012.01)
*H04L 12/58* (2006.01)

(52) U.S. Cl.
CPC .................................. *H04L 51/32* (2013.01)

(58) Field of Classification Search
CPC ....... H04L 67/30; H04L 67/306; H04L 67/22; H04L 63/102; H04N 21/44204; H04N 21/44213; H04N 21/4622; H04N 21/4307; H04N 21/8133; H04N 21/252; H04N 5/445; G06F 17/30035; G06F 17/30864; G06F 17/3053; G06F 17/3089; G06F 17/30699; G06Q 50/01; G06Q 30/0269; G06Q 30/0263; G06Q 20/389; G06Q 10/1093; G06Q 40/00; G06N 5/02; G06N 5/00; G06N 99/005
USPC ... 725/50; 707/748, 754, E17.014, 602, 728, 707/784; 705/319, 14.66, 7.18, 36, 35; 715/733; 704/9; 706/46
See application file for complete search history.

(56) References Cited

U.S. PATENT DOCUMENTS

| 7,765,209 | B1* | 7/2010 | Khesin et al. ................ 707/736 |
| 2008/0228695 | A1* | 9/2008 | Sifry et al. ........................ 707/2 |
| 2010/0023871 | A1* | 1/2010 | Bederson et al. ............ 715/745 |
| 2010/0070448 | A1* | 3/2010 | Omoigui ........................ 706/47 |
| 2010/0119053 | A1* | 5/2010 | Goeldi ..................... 379/265.09 |
| 2010/0121707 | A1* | 5/2010 | Goeldi ........................ 705/14.49 |
| 2010/0274815 | A1* | 10/2010 | Vanasco ........................ 707/798 |
| 2010/0318537 | A1* | 12/2010 | Surendran et al. ........... 707/759 |
| 2011/0040760 | A1* | 2/2011 | Fleischman et al. ......... 707/737 |
| 2011/0047182 | A1* | 2/2011 | Shepherd ............... G06Q 50/01 707/780 |
| 2011/0238673 | A1* | 9/2011 | Carter et al. .................. 707/748 |
| 2011/0251972 | A1* | 10/2011 | Martin .......................... 705/319 |
| 2011/0288897 | A1* | 11/2011 | Erhart et al. ................. 705/7.13 |
| 2011/0302153 | A1* | 12/2011 | Meretakis et al. ............ 707/722 |
| 2012/0271676 | A1* | 10/2012 | Aravamudan et al. ...... 705/7.18 |
| 2013/0046826 | A1* | 2/2013 | Stanton .................. G06Q 10/10 709/204 |
| 2014/0067933 | A1* | 3/2014 | Sacks et al. .................. 709/204 |

* cited by examiner

*Primary Examiner* — Brian J Gillis
*Assistant Examiner* — Matthew Ballard
(74) *Attorney, Agent, or Firm* — Patent Law Works LLP

(57) ABSTRACT

Event-related data including at least one event-related record belonging to a first user is received. The event-related record is processed for an event. The event is classified into an event type using a plurality of predefined event types. A post for the event based on the event type is generated and a content stream of the first user is populated with the post.

21 Claims, 9 Drawing Sheets

BOOTSTRAP SOCIAL NETWORK USING EVENT-RELATED RECORDS

BACKGROUND

The present disclosure relates to bootstrapping a social network using event-related records.

People are increasingly turning to social networks to communicate and share information. For example, users can access their own content streams and the content streams of others on a given social network to view various posts and receive updates. However, in many cases, the events that are not shared by users via a social network will be missing from the content stream of those users. As a result, only events dating back to the time the user began using the social network, and that the user shared via that social network, might be included in that user's content stream.

SUMMARY

According to one innovative aspect of the subject matter being described in this disclosure, a system receives event-related data including at least one event-related record belonging to a first user. The system processes the event-related record for an event and classifies the event into an event type using a plurality of predefined event types. The system generates a post for the event based on the event type and populates a content stream of the first user with the post.

In general, another innovative aspect of the subject matter described in this disclosure may be embodied in methods that include receiving event-related data including at least one event-related record belonging to a first user; processing the event-related record for an event; classifying the event into an event type using a plurality of predefined event types; generating a post for the event based on the event type; and populating a content stream of the first user with the post.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include processing the event-related record for event-related attributes that correspond to the event; applying an event template associated with the event type, the event template including one or more required fields; processing the event-related attributes for information corresponding to the one or more required fields; generating the post for the event based on the event template and the information; that at least one record includes an electronic message thread and a calendar entry; that the electronic message thread and the calendar entry are aligned based on a similarity; processing the event-related record includes processing the electronic message thread and the calendar entry to determine the event; processing the event-related data includes assigning scores to the event-related records based on one or more criteria and filtering out one or more of the event-related records having scores that do not satisfy a predetermined threshold; classifying one or more events of the one or more event-related records that are unfiltered by the filtering; generating one or more posts based on the one or more event-related records; populating the content stream with the one or more posts; receiving interaction data reflecting an interaction by the first user or another user with a post of the content stream; determining an event type corresponding to the post of the content stream; modifying scores that are assigned during the processing of a subsequent set of event-related records based on the event type; processing sets of contacts, sets of contact-related attributes, and sets of event-related attributes from the event-related records; assigning first importance scores to the sets of contacts based on the sets of contact-related attributes that respectively correspond to the sets of contacts; assigning second importance scores to the event-related records based on one or more criteria including the first importance scores and the sets of event-related attributes corresponding to the event-related records; filtering out one or more event-related records having second importance scores less than the predetermined threshold; and determining one or more events based on one or more sets of event-related attributes corresponding to one or more event-related records that are unfiltered by the filtering.

For instance, the features may include that at least one record includes an electronic message-thread or calendar entry belonging to the first user and that the event-related data includes a plurality of event-related records.

These implementations are particularly advantageous in a number of respects. For instance, the technology described herein can populate the user's content stream with past significant events that are memorialized in that user's electronic messages and calendar entries. The technology can also supplement the user's content stream with current events that were communicated by the user to other users using electronic messages and calendar invitations. It should be understood, however, that this list of features and advantages is not all-inclusive and many additional features and advantages are contemplated and fall within the scope of the present disclosure. Moreover, it should be noted that the language used in this disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
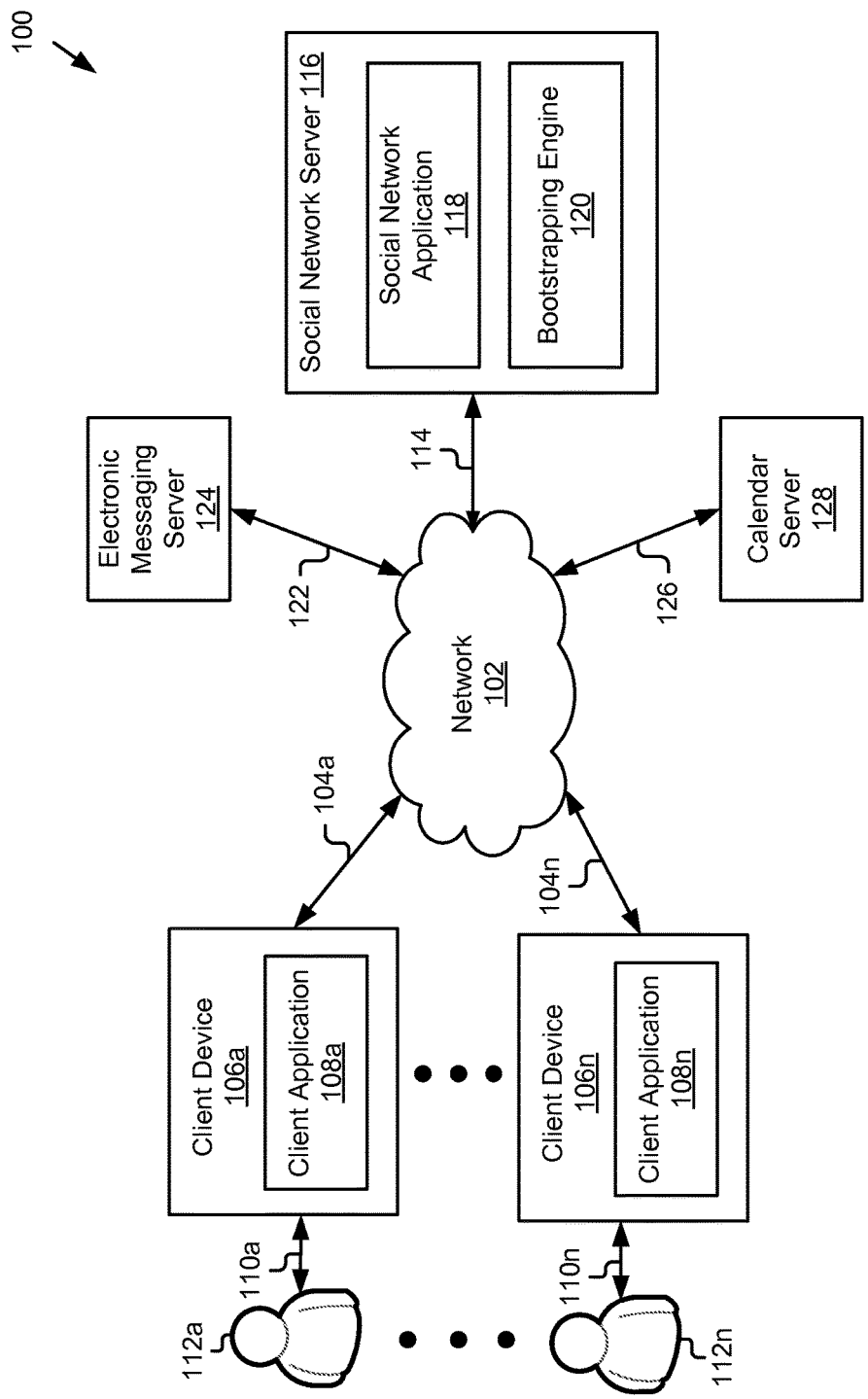
FIG. 1 is a block diagram illustrating an example system for bootstrapping a social network using event-related records.

FIG. 1 is a block diagram illustrating an example system 100 for bootstrapping a social network using event-related records. In the depicted implementation, the system 100 includes a social network server 116, client devices 106a . . . 106n (also referred to herein individually and collectively as 106) that are accessible by users 112a . . . 112n (also referred to herein individually and collectively as 112), an electronic messaging server 124, and a calendar server 128. In the depicted implementation, the entities 116, 106a . . . 106n, 112a . . . 112n, 124, and 128 are electronically communicatively coupled via a network 102. However, the present disclosure is not limited to this configuration and a variety of different system environments and configurations may be employed and are within the scope of the present disclosure. Other implementations may include additional or fewer computing devices, services, and/or networks. Further, while the present disclosure is described above primarily in the context of activities related to social networking, it is applicable to any type of electronic communication within or between entities of a network.

In some implementations, the entities of the system 100 may use a cloud-based architecture where one or more computer functions or routines are performed by remote computing systems and devices at the request of a local computing device. For example, a client device 106 may be a computing device having hardware and/or software resources and may access hardware and/or software resources provided across the network 102 by other computing devices and resources, including, for instance, other client devices 106, the social network server 116, the electronic messaging server 124, the calendar server 128, or any other entities of the system 100.

The network 102 is a network for interconnecting computing nodes. The network 102 may have any number of configurations or topologies. For example, the network 102 may have a star, token ring, or other known topology or hybrid thereof. The network 102 may include a local area network (LAN), a wide area network (WAN) (e.g., the Internet), and/or any other interconnected data path across which multiple devices may communicate. The network 102 may be coupled to or include a mobile (cellular) network including distributed radio networks and a hub providing a wireless wide area network (WWAN), or other telecommunications networks. In some implementations, the network 102 may include Bluetooth® communication networks for sending and receiving data. The network 102 may transmit data using a variety of different communication protocols including, for example, various Internet layer, transport layer or application layer protocols. For example, the network 102 may transmit data using user datagram protocol (UDP), transmission control protocol (TCP), HTTP, HTTPS, file transfer protocol (FTP), WebSocket (WS), WAP, IMAP, SMTP, POP, SMS protocol, MMS protocol, XMS protocol, or other known protocols.

The client devices 106a . . . 106n are computing devices having data processing and data communication capabilities. In the depicted implementation, the client device 106a is coupled to the network 102 via signal line 104a, and the user 112a's interactions with client device 106a are depicted by line 110a; and the client device 106n is coupled to the network 102 via signal line 104n, and the user 112n's interactions with the client device 106n are depicted by line 110n.

In some implementations, a client device 106 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In some implementations, the client device 106 can be a handheld wireless computing device which is capable of sending and receiving voice and/or data communications.

The client device 106 may include a computer processor, a memory, a power source, and a communication unit including one or more network interfaces for interacting with the network 102, including, for example, wireless transceivers to broadcast and receive network data via radio signals. The client device 106 may also include one or more of a graphics processor; a high-resolution touchscreen; a physical keyboard; forward and rear facing cameras; sensors like accelerometers and/or gyroscopes; a GPS receiver; a Bluetooth® module; memory storing applicable firmware; and various physical connection interfaces (e.g., USB, HDMI, headset jack, etc.); etc.

Additionally, an operating system for managing the hardware and resources of the client device 106, application programming interfaces (APIs) for providing applications access to the hardware and resources, a user interface module for generating and displaying interfaces for user interaction and input, and applications including, for example, applications for making phone calls, video calls, web browsing, messaging, social networking, gaming, capturing digital video and/or images, etc., may be stored and operable on the client device 106. While FIG. 1 illustrates two or more client devices 106, the present disclosure applies to any system architecture having any number of client devices 106.

In the depicted implementation, the client device 106 contains a client application 108 executable by a processor (not shown) of the client device 106 to provide for user interaction, and to send and receive data via the network 102. In particular, the client application 108 is operable to instruct the client device 106 to render user interfaces, receive user input, and send information to and receive information from the social network server 116, and the other entities of the system 100. In these or other implementations, the client application 108 is stored in a memory (not shown) of the client device 106 and is accessible and executable by a processor (not shown).

In some implementations, the client application 108 generates and presents user interfaces to the user 112 via a display (not shown). For example, the client application 108 may generate and present the user interface 800 depicted in FIG. 8, based at least in part on information received from the social network server 116 via the network 102. In some implementations, the client application 108 receives interface instructions from the social network application 118 or the bootstrapping engine 120 of the social network server 116 via the network 102 in the form of a mark-up language (e.g., HTML, XML, etc.), style sheets (e.g., CSS, XSL, etc.), graphics, and/or scripts (e.g., JavaScript, ActionScript, etc.), and then interprets the interface instructions and renders an interactive Web User Interface (WUI) for display on the client device 106 based thereon. In some implementations, some or all of the interface instructions are provided by the client application 108 while the substantive information is provided by the social network server 116. Other variations are also contemplated and within the scope of this disclosure. The client application 108 is also operable to receive input signals from the user 112 via an input device (not shown) of the client device 106, and to send information to and receive information from the social network application 118 and the bootstrapping engine 120 via a communication unit (not shown) (e.g., one like or substantially similar to the communication unit 208).

As depicted in FIG. 1, the social network server 116, the electronic messaging server 124, and the calendar server 128 are respectively coupled to the network 102 via signal lines 114, 122, and 126, for interaction with each other and the other components of the system 100. The social network server 116, the electronic messaging server 124, and the calendar server 128 may be a computing device having one or more processors and one or more storage devices storing data or instructions for execution by the one or more processors. For example, a computing device may be a hardware server, a server array or any other computing device, or group of computing devices, having data processing, storing and communication capabilities. The computing device may also be a virtual server (i.e., a virtual machine) implemented via software. For example, the virtual server may operate in a host server environment and accesses the physical hardware of the host server including, for example, a processor, memory, storage, network interfaces, etc., via an abstraction layer (e.g., a virtual machine manager). Although only one social network server 116, electronic messaging server 124, and calendar server 128 is shown; multiple social network servers 116, electronic messaging servers 124, and calendar servers 128 may be included in the system 100. Furthermore, it should be understood that any of the entities of the system 100 can be stored in any combination of devices and servers or in one device or server.

The electronic messaging server 124 is a computing device for sending, receiving, managing, and providing access to electronic messages. While not depicted, the electronic messaging server 124 may include an electronic message application operable to send, store, receive, manage, and provide access to the electronic messages. The electronic message application may be operable to store electronic messages received, composed, saved, and/or sent by users in a data store, and provide access to these messages to the other entities of the system 100 including, for example, the social network server 116. In some implementations, the electronic messaging application requires user consent be provided before providing access to a user's electronic messages to these other components.

The calendar server 128 is a computing device for organizing, editing, sending, managing, and providing access to calendar-related data including, for example, calendar entries. While not depicted, the calendar server 128 may include a calendar application operable to perform the above discussed functionality. In some implementations, the calendar application may be operable to store calendar entries received, composed, saved, and/or sent by users in a data store, and provide access to these entries to the other entities of the system 100 including, for example, the social network server 116. In some implementations, the calendar application requires user consent be provided before providing access to a user's calendar entries to these other components.

In the depicted implementation, the social network server 116 includes a social network application 118 and a bootstrapping engine 120. The social network application 118 provides functionality for a social networking service (also referred to as a social network) and the bootstrapping engine 120 cooperates with the social network application 118 to bootstrap a social network content stream with posts using event-related records. Additional structure and functionality of the social network application 118 and the bootstrapping engine 120 are further described below with reference to at least FIGS. 2A and 2B.

While only the social network server 116 is depicted in FIG. 1 as including a bootstrapping engine 120, it should be understood that this implementation is provided by way of example and that any single entity or any number of entities may include an instance of the bootstrapping engine 120. For example, the electronic messaging server 124, the calendar server 128, or a third party server (not shown) could store and operate an instance of the bootstrapping engine 120, and provide access to the functionality of it to the other entities of the system 100 via an application programming interface (API).

The social network server 116, the social network application 118, the bootstrapping engine 120, the electronic messaging server 124, and the calendar server 128 may require users to register for a user account to access various functionalities and services provided by these entities. For example, to register, a credential module included in and operated by a given entity of the system may require a user 112 to provide identifying information, for example, a valid electronic address and password, and the application may test the validity of the electronic address by sending the a confirmation message to the address containing instructions for confirming the account (e.g., selecting a hyperlink to a confirmation webpage operated by the service provider). Once registered, the credential module may require a user seeking access to the service operated by this entity to authenticate by inputting the identifying information in an associated user interface.

Figure 2A:
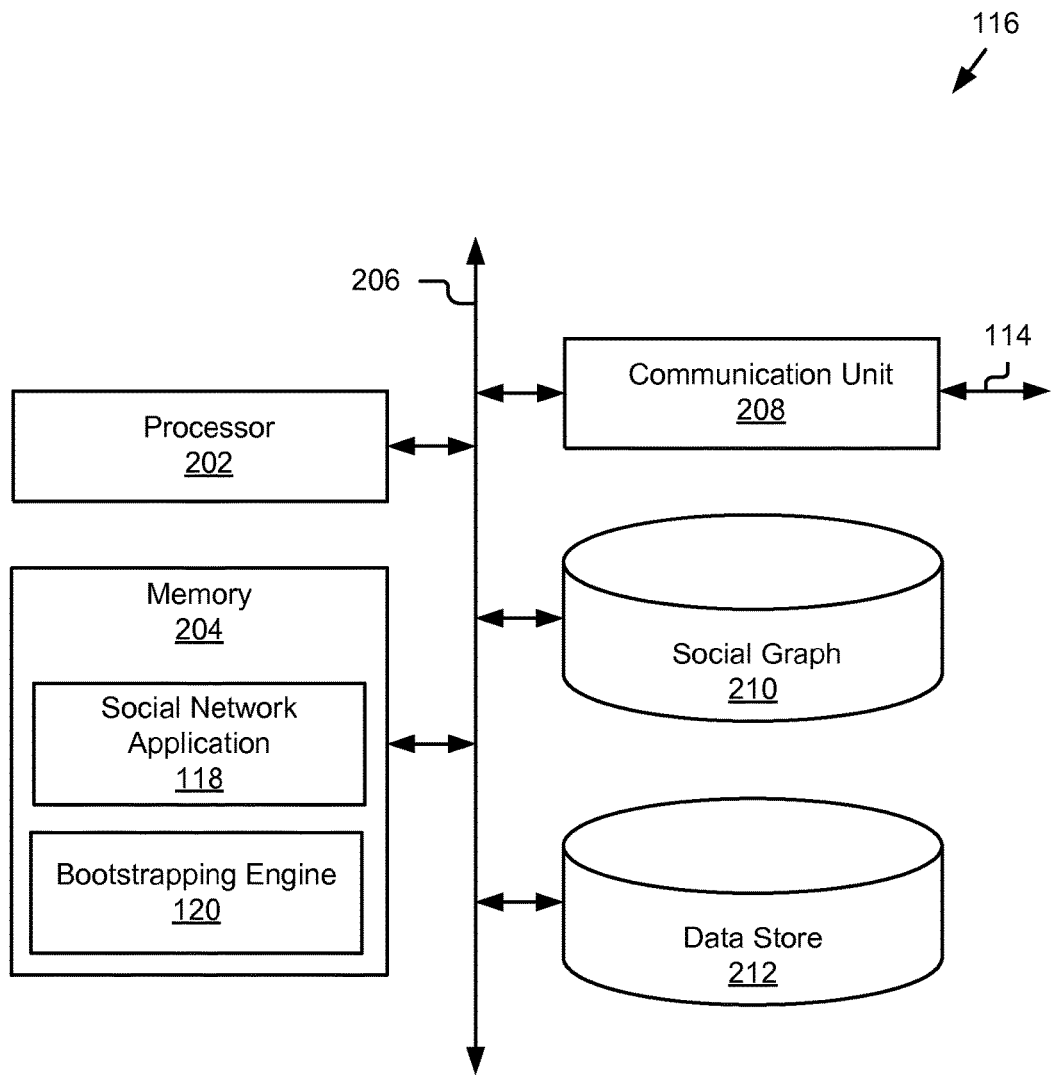
FIGS. 2A and 2B are block diagrams illustrating an example social network server.
Figure 2B:
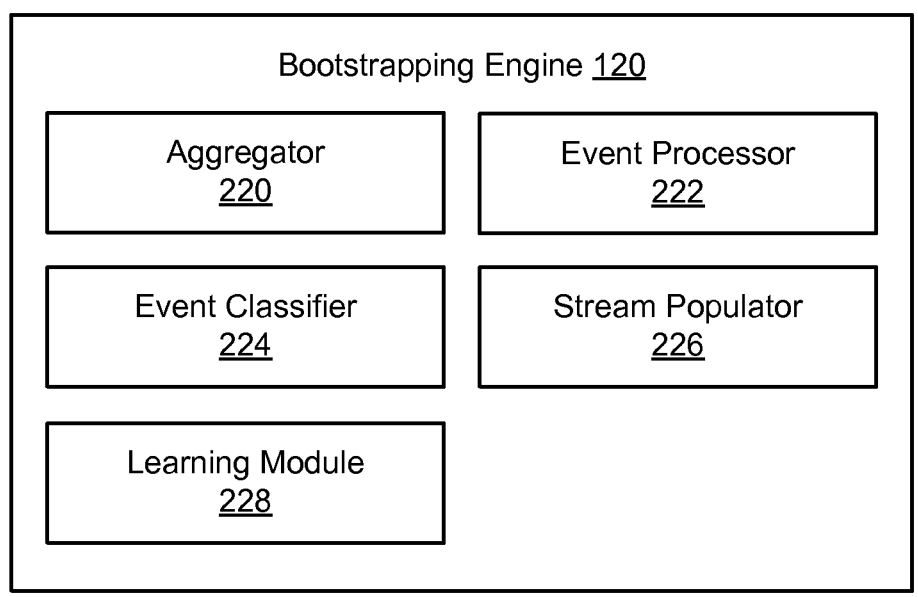

FIGS. 2A and 2B are block diagrams of an example social network server 116. In the depicted implementation, the social network server 116 includes a processor 202, a memory 204, a communication unit 208, a social graph 210, and a data store 212, which are communicatively coupled via a bus 206. The memory 204 is depicted as including the social network application 118 and the bootstrapping engine 120. In various implementations, the social network application 118 and/or the bootstrapping engine 120 may be sets of instructions stored in the memory 204 and executable by the processor 202 for communication with the other components of the social network server 116; may be implemented via one or more application specific integrated circuits (ASICs) coupled to the bus 206 for cooperation and communication with the other components of the social network server 116; sets of instructions stored in one or more discrete memory devices (e.g., a PROM, FPROM, ROM) that are coupled to the bus 206 for cooperation and communication with the other components of the social network server 116; other hardware or software; a combination thereof; etc.

The social network server 116 depicted in FIG. 2A is provided by way of example and it should be understood that the social network server 116 may take other forms and include additional or fewer components without departing from the scope of the present disclosure. For example, while not shown, in some implementations, the social network server 116 may include input and output devices (e.g., a computer display, a keyboard and mouse, etc.), various operating systems, sensors, additional processors, and other physical configurations. Additionally, it should be understood that the computer architecture depicted in FIG. 2A is applicable to the other entities of the system 100 with various modifications. For example, a third party server (not shown) including the functionality of the bootstrapping engine 118, the electronic messaging server 124, and/or the calendar server 128 could have the same or a similar architecture as the social network server 116 depicted in FIG. 2A, including, for instance, the processor 202, the memory 204, the communication unit 208, and the data store 212 coupled via the bus 206.

The bus 206 can include a conventional communication bus for transferring data between components of a computing device or between computing devices, a network bus system including the network 102 or portions thereof, a processor mesh, a combination thereof, etc. In some implementations, the social network application 118, the bootstrapping engine 120 and its sub-components 220, 222, 224, 226, and 228 (see FIG. 2B), and/or various software operating on the social network server 116 (e.g., an operating system) may cooperate and communicate via a software communication mechanism implemented in association with the bus 206. The software communication mechanism can include and/or facilitate, for example, inter-process communication, local function or procedure calls, remote procedure calls, an object bus (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The processor 202 includes an arithmetic logic unit, a microprocessor, a general purpose controller, or some other processor array to perform computations and provide electronic display signals to a display device (not shown). The processor 202 may be coupled to the bus 206 for communication with the other components of the social network server 116. The processor 202 may process data signals and may have various computing architectures including a complex instruction set computer (CISC) architecture, a reduced instruction set computer (RISC) architecture, or an architecture implementing a combination of instruction sets. Although only a single processor 202 is shown in FIG. 2A, multiple processors may be included and each processor may include a single processing core or multiple interconnected processing cores. The processor 202 may be capable of supporting the display of images and the capture and transmission of images, perform complex tasks, including various types of feature extraction and sampling, etc.

The memory 204 stores instructions and/or data that may be executed by the processor 202. In the depicted implementation, the memory 204 stores at least the social network application 118 and the bootstrapping engine 120. The memory 204 is also capable of storing other instructions and data, including, for example, an operating system, hardware drivers, other software applications, databases, etc. The memory 204 is coupled to the bus 206 for communication with the processor 202 and the other components of social network server 116. The instructions and/or data may include code for performing any and/or all of the techniques described herein. In particular, the memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. A non-transitory computer-usable storage medium may include any and/or all computer-usable storage media. In some implementations, the memory 204 may include volatile memory, non-volatile memory, or both. For example, the memory 204 may include one or more of a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, and any other mass storage device known for storing information on a more permanent basis. It should be understood that the memory 204 may be a single device or may include multiple types of devices and configurations.

The communication unit 208 may include devices for communicating with other electronic devices. For example, the communication unit 208 may include wireless network transceivers (e.g., Wi-Fi™, Bluetooth®, cellular), wired network interfaces (e.g., a CAT-type interface), USB, Firewire, or other known interfaces. The communication unit 208 may provide connections to the network 102 and to other entities of the system 100 using standard communication protocols including, for example, those discussed with reference to the network 102. The communication unit 208 may link the processor 202 to the network 102, which may in turn be coupled to other processing systems. In the depicted implementation, the communication unit 208 is coupled to the network 102 via signal line 114 for communication and interaction with the other entities of the system 100.

A social network is any type of social structure where the users are connected by one or more common features. The common features can include any attribute, interest, preference, relation, or interaction attributable to the users. For example, the common features include relationships/connections, e.g., professional and academic attributes and interests, friendships, familial ties, etc. The common features can also include explicitly-defined relationships and relationships implied by social connections with other online users and entities. The common features can be provided by one or more social networking systems, including, for example, those included in the system 100. These common features, which may be stored as profile information for the users, can be mapped by the social network application 118 to connect the users.

A user's social graph may include social graph connection information describing connections between that user and the other users of the social network; what common features (e.g., attributes, interests, social network activity, relationships, etc.) connect that user to other users; any groups/sets formed by that user and/or the social network application 118 to categorize or group his or her connections on the social network; the strength of the connections (i.e., affinity) between the user and other users, which can be calculated based on, for example, the degree or degrees (e.g., 1st, 2nd, 3rd, 4th, etc.) of separation between the user and other users, who, if any, the connecting/interstitial users are; the amount or type of interactions between the users, etc.; etc. For instance, the social network application 118 and/or a user (e.g., via an associated user interface), may define groups for users who are work friends, school friends, networking contacts, clients, etc., and user's social graph may include data reflecting what groups these users belong to. Together, the social graphs of the users form a collective social graph 210 that reflects a mapping of all of the users of the social network and how they are related.

In some implementations, the information stored by the social graph 210 is stored in the memory 204 of the social network server 116. In other implementations, the social graph 210 is included in a memory, computing device and/or storage system distinct from but accessible by the social network server 116. In various implementations, the social graph 210 stores records, files, objects, data, etc., in cooperation with a file system executable by the processor 202. The social graph 210 may additionally or alternatively include a database management system (DBMS) executable by the processor 202 to manage a collection of records, files, objects, etc. For example, the database could be a structured query language (SQL) and/or a NoSQL DBMS storing data that can be manipulated using programmatic operations (e.g., queries and statements) by the social network application 118, the bootstrapping engine 120, and the other entities of the system 100.

The data store 212 is an information source capable of storing and providing access to data to the various entities coupled to the network 102. In the depicted implementation, the data store 212 is coupled for communication with the components 202, 204, 208, and 210 of the server 116 via the bus 206, and coupled, via the processor 202, for communication with the components 220, 222, 224, 226, and 228 of the bootstrapping engine 120 (see FIG. 2B). In some implementations, the data store 212 includes a database management system (DBMS) operable on the social network server 116 or another computing device and storable in the memory thereof. For example, the DBMS could be a structured query language (SQL) DBMS and the components 220, 222, 224, 226, and 228 (see FIG. 2B) are configured to manipulate, i.e., store, query, update, and/or delete, data stored in the data store 212 using programmatic operations (e.g., SQL queries and statements).

The data stored by the data store 212 may include information generated, received, or sent by the bootstrapping engine 120 and/or its sub components 220, 222, 224, 226, and 228 (see FIG. 2B); the social network server 116; the electronic messaging server 124; and the calendar server 128. In some instances, one or more of the components 220, 222, 224, 226, 228, 116, 124, and 128 discussed above may use the data in the data store 212 to perform their respective functionalities as discussed elsewhere herein.

The bootstrapping engine 120 is software, code, logic, or routines for bootstrapping a social network content stream with posts using event-related records. As depicted in FIG. 2B, the bootstrapping engine 120 includes an aggregator 220, an event processor 222, an event classifier 224, a stream populator 226, and a learning module 228, which cooperatively provide the functionality of the bootstrapping engine 120. However, the arrangement illustrated in FIG. 2B is provided by way of example, and it should be understood that other arrangements are possible. For example, an alternative arrangement could combine the functionality of one or more of the components 220, 222, 224, 226, and/or 228 into a single component, integrate the bootstrapping engine 120 into other software applications (e.g., the social network application 118), or vice versa, or further divide the modules into separate additional cooperative components.

In the depicted implementation, the components 220, 222, 224, 226, and/or 228 are electronically communicatively coupled for cooperation and communication with each other, the social network application 118, the processor 202, the memory 204, the communication unit 208, the social graph 210, and/or the data store 212. These components 220, 220, 224, 226, and 228 are also coupled for communication with the other entities (e.g., client devices 106, the social network server 116, the electronic message server 124, and the calendar server 128) of the system 100 via the network 102.

In some implementations, the social network server 116, the bootstrapping engine 120, the aggregator 220, the event processor 222, the event classifier 224, the stream populator 226, and the learning module 228 are sets of instructions executable by the processor 202, or logic included in one or more customized processors, to provide their respective functionalities. In some implementations, the social network server 116, the bootstrapping engine 120, the aggregator 220, the event processor 222, the event classifier 224, the stream populator 226, and/or the learning module 228 are stored in the memory 204 of the social network server 116 and are accessible and executable by the processor 202 to provide their respective functionalities. In any of these implementations, the social network server 116, the bootstrapping engine 120, the aggregator 220, the event processor 222, the event classifier 224, the stream populator 226, and/or the learning module 228 are adapted for cooperation and communication with the processor 202 and other components of the social network server 116.

The aggregator 220 is software, code, logic, or routines for aggregating event-related data that includes event records. In some implementations, the event related data includes message-related and/or calendar-related data. For example, the message-related data may include records like electronic message threads and the calendar-related data may include records like calendar entries, as discussed in further detail below with reference to at least the event processor 222. However, it should be understood that the event-related data is not limited to including electronic message threads and calendar entries and may include other types of records including images, videos, documents, and other content. For instance, upon user consent, the aggregator 220 may aggregate images, videos, and documents from online services (e.g., photo, video, and document hosting services) or native applications that the users uses to compose, post, share, and/or otherwise manage those records.

The aggregator 220 aggregates the event-related data from one or more information sources including, for example, the electronic messaging server 124, the calendar server 128, one or more client devices 106, the data store 212, and/or any other information source coupled to the network 102. In some implementations, the event-related data may include electronic messages and calendar entries stored and managed by the client devices 106, the electronic messaging server 124, the calendar server 128, and/or the social network server 116 via calendar and messaging applications operable by these devices.

The aggregator 220 can store the event-related data that was aggregated in a local repository (e.g., the data store 212) for access by the other entities (i.e., 118, 120, 222, 224, 226, and 228) of the social network server 116. The aggregator 220 may also provide aggregated event-related data directly to the event processor 222, or the other components 224, 226, and 228 of the bootstrapping engine 120. In some implementations, upon aggregating the event-related data, the aggregator 220 may instruct the event processor 222 to process the data by sending a signal to the event processor 222. In some implementations, the event processor 222 may initialize independently of the aggregator 220.

In some implementations, the aggregator 220 can aggregate the event-related data automatically at regular intervals. For example, the aggregator 220 may include a batch process that is capable of performing the aggregation periodically (e.g., every few minutes, hours, days, weeks, etc.). In other instances, the aggregator 220 may begin aggregating in response to receiving an aggregation request from the social network server 116 or another element of the system 100.

In some implementations, the aggregation request can include or be associated with an authentication token authorizing the aggregator 220 to process the event-related data. In some implementations, the social network application 118, the electronic messaging server 124, calendar server 128, and any of the other entities of the system 100 may authenticate users using a common credential module. For example, the common credential module may be implemented by a federated identity authentication service for authenticating users that is operated by the social network server 116, the electronic messaging server 124, the calendar server 128, etc.

In some implementations, the aggregator 220 may act as a controller for receiving the aggregation requests, and in response to receiving, may then aggregate the event-related data, and then signal the event processor 222 to perform its operation. The bootstrapping engine 120 or the social network application 118 may also alternatively or additionally include a discrete controller to handle requests, including, for example, an aggregation request, and signal the aggregator 220, and/or other components 222, 224, 226, and 228 to perform their respective operations.

The event processor 222 is software, code, logic, or routines for processing and scoring the event-related data. The event processor 222 may be coupled to an information source including, for example, the aggregator 220, the data store 212, and/or another component of the system 100 to receive the event-related data. In some implementations, the functionality of the aggregator 220 is integrated into the event processor 222, and the event processor 222 may aggregate the event-related data independently upon receiving an aggregation request from the social network server 116 or at regular intervals as discussed above with reference to the aggregator 220.

The event related data may include a plurality of event-related records. In some implementations, an event-related record may include information about a topic that was shared with other users. For example, the event-related records may include electronic-message threads and calendar entries belonging to a user. In some implementations, an electronic message thread may include one or more electronic messages and metadata associated with the messages. For instance, an electronic message thread may include an original message that a user composed and sent to other users. The electronic message thread may further include any subsequent replies to the original message and/or to the replies to that message, and so on and so forth. Each message included in the message thread may have metadata associated with it including a distribution list that identifies the sender and one or more recipients (e.g., from, to, cc, and bcc fields). The metadata may also contain fields including, for example, a subject for the message, a timestamp (e.g., date/time), a geographic location describing where the message was sent from, a view count describing the number of times the message was viewed and accessed, attachment(s) (e.g., audio files, video files, photos/images, electronic documents, hyperlinks to multimedia resources, etc.), and the like. Each of the messages of the message thread may have a message body that embodies the message being conveyed by the sender to the recipients. The message body may include textual data (formatted and/or plain text, etc.), images, audio data, video data, presentational information, embedded data, or any other form of data and/or formatting used to convey information, etc.

A calendar entry may likewise include a message body and metadata that collectively describe an event. The metadata may include a distribution list that identifies the event organizer and one or more recipients invited to attend the event (e.g., from, to, cc, and bcc fields). The metadata may also include a subject for the event, the time and date the event is scheduled to occur, a geographic location of the event, attachment(s) (e.g., audio files, video files, photos/images, electronic documents, hyperlinks to multimedia resources, etc.) describing the event (e.g., a menu, a program, pictures of the event location, a map, etc.), and the like. The body may include textual data (formatted and/or plain text, etc.), images, audio data, video data, presentational information, embedded data, or any other form of data and/or formatting used to describe the event.

In some implementations, the event processor 222 can process each of the records included in the event-related data for contacts, contact-related attributes, and event-related attributes. The contacts may include one or more users that a user interacted with via the record. For instance, the contacts may include one or more users from the distribution list of the record, one or more users referenced by the record (e.g., message body, an attached document, an attached photograph, etc.), etc.

The contact-related attributes may describe how the contacts of a given record are associated with one another and the user to which the record belongs, as well as the strength of that association. In some implementations, the contact-related attributes may include raw attributes processed from the record and attributes derived from the raw attributes. For example, the event processor 222 may process the record (e.g., metadata, message body(ies), etc.) for the raw contact-related attributes and then derive attributes based on the contact-related attributes and other information associated with or included in the record. In some implementations, the contact-related attributes may include one or more of a total messages exchanged between the contacts and the user, time spent by the user interacting with the contacts, number of previous interactions with the contacts, familial ties between the contacts and the user based on last name patterns, affinity between the user and the contacts on a social network, uniqueness of the contacts, how recently the contacts exchanged messages, view count describing the number of times that the user viewed or accessed a message received from the contacts, location (e.g., home, work) of the contacts and/or the user at given time, etc.

The event-related attributes are attributes that describe an event associated with a record. The event processor 222 may process the record (e.g., metadata, message body(ies), etc.) to determine the event-related attributes. In some implementations, the event processor 222 may process raw attributes from the record and then derive additional event-related attributes based on the raw attributes and/or other information associated with or included in the record. Examples of the event-related attributes, may include, but are not limited to, timestamps (i.e., date/time) associated with the event, location of the event, subject for the event, attachment(s), summary describing the event, view count describing the number of times event information was viewed or accessed, time spent on reading the record, embedded multimedia links (e.g., video links, links to external photo sharing websites etc.), representative images associated with the event, etc.

In some implementations, the event processor 222 may determine the events reflected by the records based on the event-related attributes. For instance, the event processor 222 can process the event-related attributes of a record for the topic(s) discussed by the record. As a further example, the event processor 222 can process the message text, a subject, attachments, and/or any other information included in the record to identify the events described by that information. The event processor 222 may identify patterns between words and/or phrases included in the information to identify the events. For instance, as discussed in further detail below, the event processor 222 may use a Bayesian model to determine the event a record describes, and the event classifier 224 may classify the record into an event type using the event.

In some implementations, the event processor 222 may align two or more records that are associated with the same event. Based on the alignment, the event processor 222 may determine additional information about the event (e.g., details about the event, who attended, pictures and/or videos of the event, etc.) that may otherwise not be available from a single record and/or may confirm details of the event processed from one record (e.g., when the event was held, who attended, etc.) with the details from another record. In some implementations, the event processor 222 can identify two or more records as being directed to the same event based on their respective contacts, contact-related attributes, and/or event-related attributes. For instance, the event processor 222 can align two or more records based on their respective metadata (e.g., matching distribution lists, timestamps, keywords included in the subject, etc.), their respective descriptions (e.g., matching text or keywords in the message bodies, etc.), etc.

As an example, important life events like a baby announcement, the birth of a baby, a baby shower, a 100 day party, etc., are likely to have both calendar events and electronic messages associated with them and the event processor 222 align the calendar events and electronic messages to more completely determine the details of the events and verify those details. For instance, an electronic message thread may fail to mention the date of the baby shower but the calendar entry may include that date, and by aligning the two, the event processor 222 can use both to more completely determine the details about the baby shower.

In some implementations, to determine how closely related a calendar event and electronic message thread are, the event processor 222 can determine whether the contacts (e.g., those invited by the user) from the calendar entry and the contacts (e.g., recipients of a message from the user) from an electronic message thread overlap and can determine whether the textual description from the calendar entry and the textual description from the electronic message thread contain similar content (e.g., by matching the text, patterns, etc.). Based on this determination, the event processor 222 may approximate whether the records are a match. In some implementations, to determine whether two or more records match, the event processor 222 may score the records being aligned based on the number and/or strength of the similarities between their attributes (e.g., contacts, contact-related attributes, event-related attributes, etc.), and if the score satisfies a predetermined alignment threshold, may determine the records to match.

In some implementations, the event processor 222 may be unable to determine the events for two or more records by processing them separately and instead may align those records based on similarities between them (e.g., between the contacts, contact-related attributes, event-related attributes, etc.) and then use content from those records collectively to determine the events they relate to and whether the events are the same.

In some implementations, the event processor 222 can score the contacts associated with the records. The scores assigned by the event processor 222 may reflect how important the contacts are relative to the events, the users to which the records belong, etc. In some implementations, the event processor 222 can, for a given record, score the contacts associated with that record based on the contact-related attributes processed from the record. For example, the event processor 222 can score the contacts based on one or more of the number of contacts, the affinity between the user to which the record belongs and the contacts on the social network (e.g., as reflected in the social graph 210), the level of exchange (i.e., back and forth) in the record between the user and the contacts, the number of users who accepted a calendar invitation (if the record is a calendar entry), whether the user and contacts are relatives (e.g., based on last name processing), how recently the contacts exchanged messages, the amount of time the contacts and/or user spent viewing or exchanging messages, etc.

In some implementations, the more closely related the contacts are to one another, the user, and/or to the event (as reflected by the contact-related attributes, the social graph 210, the event-related attributes, etc.), the better the score they receive from the event processors 222. For example, if, for a given record, the contact-related attributes and/or the social graph 210 reflect that the contacts are generally unrelated to one another and/or that they have little or no relation to the event, etc., the event processor 222 may score these contacts poorly relative to contacts that are related to one another and/or attended or are otherwise associated with the event.

In some implementations, the event processor 222 can score the records based on one or more criteria. The scores assigned by the event processor 222 may reflect how important the records are to the users to which they belong. The one or more criteria used to score the records may include, for example, the importance score assigned to the contacts associated with the record and one or more of the event-related attributes associated with the record including, level of activity or exchange reflected by the record (e.g., amount back and forth reflected by the electronic message thread), the number of records that relate to the event (e.g., as aligned by the event processor 222), the time spent accessing the record (e.g., opening, reading, composing a response, etc.), the importance of the event (some events carry more weight in the user's life (e.g., wedding, death in family, important milestone, etc.)), etc. As a further example, if an electronic message thread reflects little or no engagement by the users that are associated with the thread (e.g., includes a single message and no replies), the event processor 222 may assign a worse score to that record than to an electronic message thread that reflects a lot of engagement by users that are associated with the thread (e.g., includes the original message and several replies to that message).

In some implementation, the event processor 222 may determine the importance of the event embodied by a record in cooperation with the event classifier 224. For example, the event processor 222 may request the event classifier 224 to classify what type of event the event is and the event classifier 224 may classify the event into an event type and identify such to the event processor 222. The event processor 222 may then determine the significance of the event type and score the record accordingly.

It should be understood that the event processor 222 may utilize a variety of different statistical methods and scales to score the contacts and records. For example, the event processor 222 may score the records by sorting them into different importance categories (e.g., very low, low, medium, high, and very high, etc.). In another example, the event processor 222 may assign numerical values to the contacts and/or records, where a higher value reflects a more important record or set of contacts and a lower value reflects a less important record or set of contacts, or vice versa.

The event processor 222 can filter out the records that are unrelated to an event or do not contain sufficient information about a particular event. In some implementations, the event processor 222 can filter the records based on their importance scores. For instance, the event processor 222 may filter out the records having importance scores that do not satisfy a threshold. The threshold may signify whether the record is important enough to include in the content stream of the user. For instance, the threshold may require that the records have an importance score of "medium" or better. In some implementations, the threshold may be defined as a variable and the event processor 222 may retrieve the variable from memory (e.g., the memory 204) and compare the importance scores of the records to the threshold to determine whether to filter them out.

In some implementations, the threshold may vary based on the number of posts the user already has in his/her content stream. For instance, if the user is active and has a consistent distribution of posts over an applicable timeline in his/her content stream, the threshold may be more strict and may filter out all records except for those related to very significant life events (e.g., deaths, births, weddings, etc.) and thus receiving relatively high scores (e.g., 90% percentile or better, "high" or better, etc.). In another example, if the user activity on the social network is sporadic and has an inconsistent distribution of posts over an applicable timeline in his/her content stream (e.g., large gaps like a year, six months, etc., of inactivity), the threshold may be more loose and may only filter out records for which an event type cannot be determined or have relatively low scores (e.g., below 50%, "low" or worse, etc.). The records having importance scores that satisfy the threshold (i.e., are unfiltered) may be provided by the event processor 222 to the event classifier 224 to be classified, as discussed in further detail below.

The event processor 222 can store the data that it generates during processing (e.g., the contacts, contact-related attributes, event-related attributes, importance scores, alignment information, record filtering data, etc.) in a data store (e.g., the data store 212) for access and retrieval by the event processor 222 itself and/or the other components 220, 224, 226, and/or 228 of the bootstrapping engine 120, or can provide this data, or portions thereof, directly to these components 220, 224, 226, and/or 228.

The event classifier 224 is software, code, logic, or routines for classifying the events corresponding to the records using the event types. The event classifier 224 may be coupled to an information source, including, for example, the event processor 222, the data store 212, and/or another component of the system 100 to receive the record-related information including, for example, the records and associated events, contacts, contact-related information, event-related information, etc. In some implementations, the event processor 222 may process and filter the records, and then the event classifier 224 may classify and generate posts for the unfiltered records. In some implementations, the event processor 222 may signal the event classifier 224 to classify the events of various records into event types and provide the event types to the event processor 222 for use in scoring the records based on importance as discussed above.

Event types may be defined for a variety of different types of events that may happen in a user's life including, for example, a birthday, a birthday party, an anniversary, a move, a wedding, a honeymoon, a graduation, a birth, a ceremony, a death, a job change, a school change, a party, a vacation, a business trip, a new venture, a political event, a purchase (e.g., new house, car, etc.), a new membership to an online community, or any other event. In some implementations, the event classifier 224 may classify a record based on the event topic, the user and contacts associated with the record, and/or the number of records that relate to the event (e.g., number of messages and calendar entries aligned with the event), etc. For example, the event classifier 224 may classify the record by comparing metadata (e.g., keywords, identifiers, etc.) for the event of the record with metadata (e.g., keywords, identifiers, etc.) for the event types to determine a match. As a further example, if the event is the birth of a baby, the event processor 222 may have stored a set of keywords for the event (e.g., birth, baby, etc.), and the event classifier 224 can match the keywords with keywords associated with the event types to determine a matching event type.

In another example, the event classifier 224 may classify the event based on whether the group of users belong to the same group on the social network (as reflected by the social graph 210), past interaction between the users as reflected by the aggregated records belonging to the user (e.g., electronic message threads, calendar entries, etc.), etc. For example, the event classifier 224 may match the event of a given record to a holiday party event type but may be uncertain as to whether the party is work-related. To make this determination, the event classifier 224 may compare the record's contacts to the groups defined in the social graph 210. The social graph 210 may include a group defined by the user for the user's friends and family and a group for the user's co-workers and the event classifier 224 may determine that the contacts overlap the users in the co-worker group. Based on this, the event classifier 224 may match the event to the more specific event type of a work-related holiday party. It should be understood that numerous other variations are also possible and are encompassed by the present disclosure.

In some implementations, the event classifier 224 may maintain event templates for the event types and apply the event templates to the records once they have been classified so event-based posts can be generated for the events. An event template may be maintained for each event type defined in the data store. An event template may include a description for the event and a plurality of custom fields that can be populated with information from the record (or aligned set of records) to which the template is being applied.

The event classifier 224 may apply an event template to a matching record (or set of aligned records) by retrieving the event template from the data store 212 and then processing the contacts, the contact-related attributes, and/or the event-related attributes of the record(s) for information to populate the fields of the event template with. For example, the event template may include fields for the title, the date/time, the geographic location, photographs and/or videos, a description, various event specifics, the organizer, the users that attended and/or were informed about the event, etc., and the event classifier 224 may process the information from the record(s) for the information that matches these fields and may then populate them with that information. For instance, the event may be the birth of a baby and the event classifier 224 may apply event template that announces the birth of the baby and includes fields for custom information that is desirable to include in such an announcement including, for example, the baby's name, date and time of birth, weight, height, photos, etc. The event classifier 224 may process the event-related information of the record for information corresponding to these fields and populate them accordingly.

In some implementations, the event classifier 224 is capable of determining event types and event templates using supervised classification. For example, the event classifier 224 may receive a corpus of sample records that have been manually tagged with the event types they relate to. The event classifier 224 may generate a graphical model (e.g., using a Bayesian algorithm) based on the information (e.g., textual description, subject, tags, etc.) included in the sample records. The graphical model may include the event types for the records and may map related keywords and phrases to those event types. Templates corresponding to these event types may also be manually defined and stored in the data store 212.

The event classifier 224 can autonomously learn about new event types and develop existing event types by adapting the patterns included in the model to the records it classifies. For example, based on this learning, the event classifier 224 may define a new event template for a new event type using the information from one or more records determined by the event classifier 224 as related to that event type. In another example, based on this learning, the event classifier 224 can add additional fields or information to an existing event template derived from one or more records that the event classifier 224 determines as being related. In some implementations, this learning may be probabilistic in nature. For example, the event classifier 224 may use logistic regression, support vector machines, decision tree algorithms, etc., to predict new event types based on patterns included in the records being processed by the bootstrapping engine 120. The training performed by the event classifier 224 provides numerous benefits including, but not limited to, continuously evolving the types of events that can be used to classify the records processed by the event classifier 224.

In some implementations, if there is sufficient information to populate the fields of the event template for a given event, the event classifier 224 generates a post based on the populated event template and provides it to the stream populator 226 for insertion into the content stream of the user. In some implementations, the event classifier 224 can provide the event-related posts that it generates directly to the stream populator 226, or may store the event-related posts in an information source (e.g., the data store 212) for access and retrieval by the stream populator 222 and/or the other components 220, 222, 226, and/or 228 of the bootstrapping engine 120. In some implementations where there is insufficient information from the record or aligned records to populate the fields of the event template, the event classifier 224 may skip populating the event template and generating an event-based post from it, may request the event processor 222 to process records of the user again to attempt to identify additional event-related information that can be used by the event classifier 224 to populate the required fields of the template, or may set the record aside until additional records have been aligned with it by the event processor 222 and it is determined that there is sufficient information with which to populate the event template.

The stream populator 226 is software, code, logic, or routines for populating the content stream of users with event-based posts generated by the event-classifier 224. The stream populator 226 may be coupled to an information source, including, for example, the event classifier 224, the data store 212, and/or any other entities of the system 100 to access/receive event-based posts. An event-based post may include any combination of textual, graphical, video, audio data, and/or other data used for relaying the event information. In some implementations, an event-based post may include a (textual and/or graphical) description about a topic and hyperlink(s) (e.g., a URL) to the event-related record(s) from which it has been generated.

In some implementations, the stream populator 226 can annotate the event-based post(s) with information identifying that the event-based post(s) were generated based on the user's record(s). For example, if an event-based post is generated based on a recent electronic message thread belonging to the user, then the stream populator 226 may annotate the post with an annotation informing the user of such. An example of an annotated post is depicted in the example user interface 800 of FIG. 8.

In some implementations, users' content streams may order the posts they include based on time and date. For example, posts that were posted to the content stream by a user using the functionality of the social network application 118 (e.g., via a user interface that includes options for entering a status, comment, note, etc., checking in a location, endorsing other content, etc.) may be inserted into that user's content stream by the social network application 118 according to the date/time they were input and submitted by the user. For event-based posts, the stream populator 226 may insert them into the content stream of a user according to the time and date that the post(s) occurred. This is advantageous as it can supplement the content stream of the user with additional content that predates when the user registered and began using the functionality of the social network application 118. In addition, the posts posted by the user using the social network application 118 may, in some instances, only represent a portion of the life of the user and supplementing the user's content stream with event-based posts processed from the user's records may paint a more complete digital picture of the user's life via the user's content stream. For example, a user may have used electronic messaging to communicate with his/her contacts for some time before using the social network to communicate, and the bootstrapping engine 120 may leverage these electronic messages to fill out the user's content stream. In some implementations, the stream populator 226 may expressly share a post being inserted into the user's content stream with the contacts associated with the record from which the post was processed. For example, the bootstrapping engine 120 may share a post with the users processed from the to:, from:, cc:, fields of the electronic message corresponding to the post.

In some implementations, the stream populator 226 may populate the content stream of a user with the event-based posts by storing the posts in association with the user for retrieval by the social network application 118 at query time (upon receiving a content stream request from the client device 106 of the user). In some implementations, the stream populator 226 may populate the content stream of a user by receiving the content stream from the social network application 118 and injecting the event-based posts into the content stream and providing the content stream to the client device 106 of the user. In some implementations, the stream populator 226 may receive the content stream request and may retrieve and populate the content stream with event-related and other posts and then provide the content stream to the entity requesting it. It should be understood, however, that numerous additional implementations are also possible, contemplated, and encompassed by the scope of the present disclosure.

The learning module 228 is software, code, logic, or routines for determining whether to bootstrap a social network content stream with event-related posts. In some implementations, to make this determination, the learning module 228 processes interaction data to determine the level of user interaction with the content stream and the types of posts the users engage with most. The learning module 228 can determine what types of events these posts relate to and store this determination in a data store (e.g., the data store 212). Based on this data, the event processor 222 can modify the scores it assigns when scoring records of the user to optimize which types of events posts are generated and included in the content stream of the user. This is advantageous as it can optimize the types of event-based posts that are generated and included in the user's content stream based on the types of events the user and/or the users' contacts engage with most when interacting with the content stream. Additional structure, functionality, and processing that can be performed by the learning module 228 are discussed in further detail below with reference to at least FIG. 6.

The learning module 228 may be coupled to an information source including, for example, the data store 212, to access the user interaction data. In some implementations, the social network application 118 may receive and store, in the data store 212, user interaction data reflecting the interactions (e.g., comments, positive or negative endorsements, re-sharing, other web analytics data, etc.) by users and/or their contacts with the posts included in the users' content streams.

The learning module 228 may autonomously perform its functionality at regular intervals or may begin processing responsive to receiving a request. For example, the learning module 228 may include a batch process that is capable of performing the processing periodically (every few minutes, hours, days, weeks, etc.). In another example, the learning module 228 may begin its processing in response to receiving a request from another component 118, 120, 220, 222, 224, and 226 of the social network server 116 or the system 100.

In some implementations, the bootstrapping engine 120 may be configured to bootstrap a user's social graph with the user's contacts stored by a service and/or computing device that is distinct from the social network, including for example the user's client device 106, the electronic messaging server 124, the calendar server 128, or another entity coupled to the network 102. In some implementations, upon user consent, the bootstrapping engine 120 may securely access the user's contacts from one or more of these other entities and incorporate them into the user's social graph, as stored by the social graph 210. For example, the aggregator 220 may aggregate a record for the user and the bootstrapping engine 120 may determine the contact-related information from the record, including the contacts associated with the record, and selectively add the contacts to the user's social graph.

In some implementations, the bootstrapping engine 120 may determine which contacts to add to the user's social graph based on one or more criteria. For example, the bootstrapping engine 120 may score the contacts (e.g., as discussed elsewhere herein) and then determine whether to add the contacts to the user's social graph based on the scores. In a further example, when adding contacts, the bootstrapping engine 120 may determine how strongly the user should be connected to one or more of the contacts based on the scores. For example, if the user exchanges electronic messages frequently with substantially the same contact/group of contacts, the bootstrapping engine 120 may closely connect/associate that/those contact(s) with the user in the social graph 210 (e.g., via a first degree connection, higher affinity score, a close-knit group, etc.). Conversely, if the user exchanges messages with a certain contact/group of contacts less frequently or irregularly, the bootstrapping engine 120 may more loosely associate that/those contact(s) with the user in the social graph 210 (e.g., via a second or third degree connection, lower affinity score, etc.). The bootstrapping engine 120 may use the same or substantially similar criteria to score, sort, filter, and/or process the contacts as it does when it scores, sorts, filters, and/or processes records to which those contacts may correspond.

In some implementations, a user's contacts (e.g., messaging, device, etc., contacts) can be converted by the bootstrapping engine 120 into social network contacts and can be stored as groups based one or more common features. For example, the groups may be based on an area code, last name, physical and/or electronic address, or any other contact-related attribute(s). In some implementations, the bootstrapping engine 120 may send an authorization request to the client device 106 of the user whose social graph is to be bootstrapped. For instance, the request may ask that user to edit and/or confirm creation of a group of contacts. In some implementations, the bootstrapping engine 120 (e.g., learning module 228) may use the corrections made to the groups suggested by it to improve future suggestions. In some implementations, the bootstrapping engine 120 may compare two or more sets of contacts (e.g., the user's messaging contacts and the contacts stored in a phone book on the user's client device) to determine any differences, and may then compare the differences with the learning data to determine whether a user should be added to an existing group. In some implementations, the bootstrapping engine 120 may bootstrap the user's social graph in combination with the event-related records that are used to bootstrap the user's social network content stream.

Additional structure and functionality of the bootstrapping engine 120 including the aggregator 220, the event processor 222, the event classifier 224, the stream populator 226, and the learning module 228 are further discussed below with reference to at least FIGS. 3-8.

Figure 3:
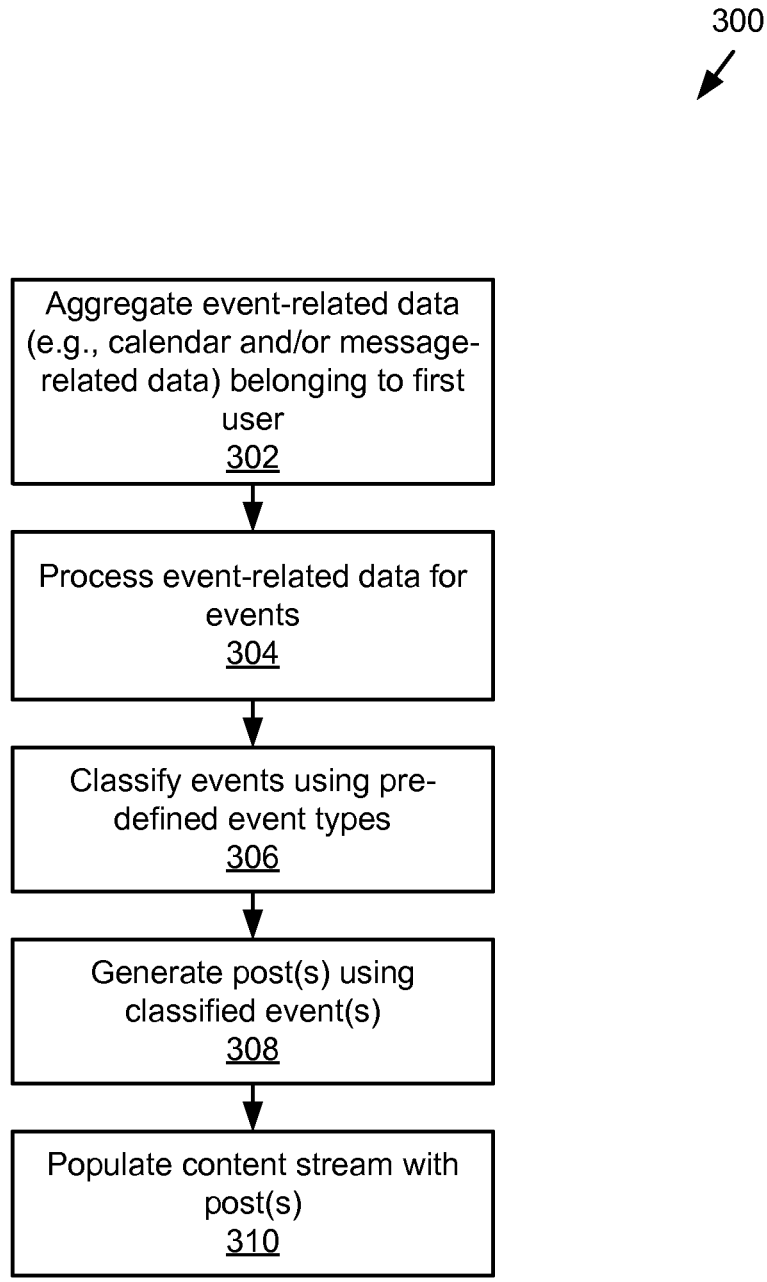
FIG. 3 is a flowchart of an example method for bootstrapping a social network using event-related data.

FIG. 3 is a flowchart of an example method 300 for bootstrapping a social network using event-related data. The method 300 may begin by aggregating 302 the event-related data (e.g., calendar data, message-related data) belonging to a first user. In some implementations, the aggregator 220 may aggregate the event-related data as discussed elsewhere herein. In some implementations, the method 300 may begin in response to receiving a signal (e.g., aggregation request) from another component of the system (e.g., the social network application 118) or may begin autonomously and perform some or all of its processing automatically at various intervals.

Next, the method 300 may process 304 the event-related data (e.g., calendar data, message-related data, etc.) aggregated in block 302 for events and classify 306 the events using event types. In some implementations, the event processor 222 processes the event-related data for the events and the event classifier 224 classifies the events using event types that are pre-defined and retrieved from a data store (e.g., the data store 212).

The method 300 can then generate 308 one or more posts using the classified events and populate 310 content stream of the first user with the generated posts. In some implementations, the event classifier 224 generates event-based post(s) based on the event classification performed in block 306 and provides the event-based post(s) to the stream populator 226. In some implementations, the event classifier 224 may generate and store the event-based post(s) in the data store 212 and the stream populator 226 may retrieve the event-based post(s) upon receiving a content request from another entity of the system (e.g., a client device 106, the social network application 118, etc.) and provide the event-based post(s) (e.g., to the social network application 118, the client device 106, etc.) for insertion into the content stream or may insert the event-based post(s) into the content stream itself and then provide the content stream to the entity requesting it.

Figure 4:
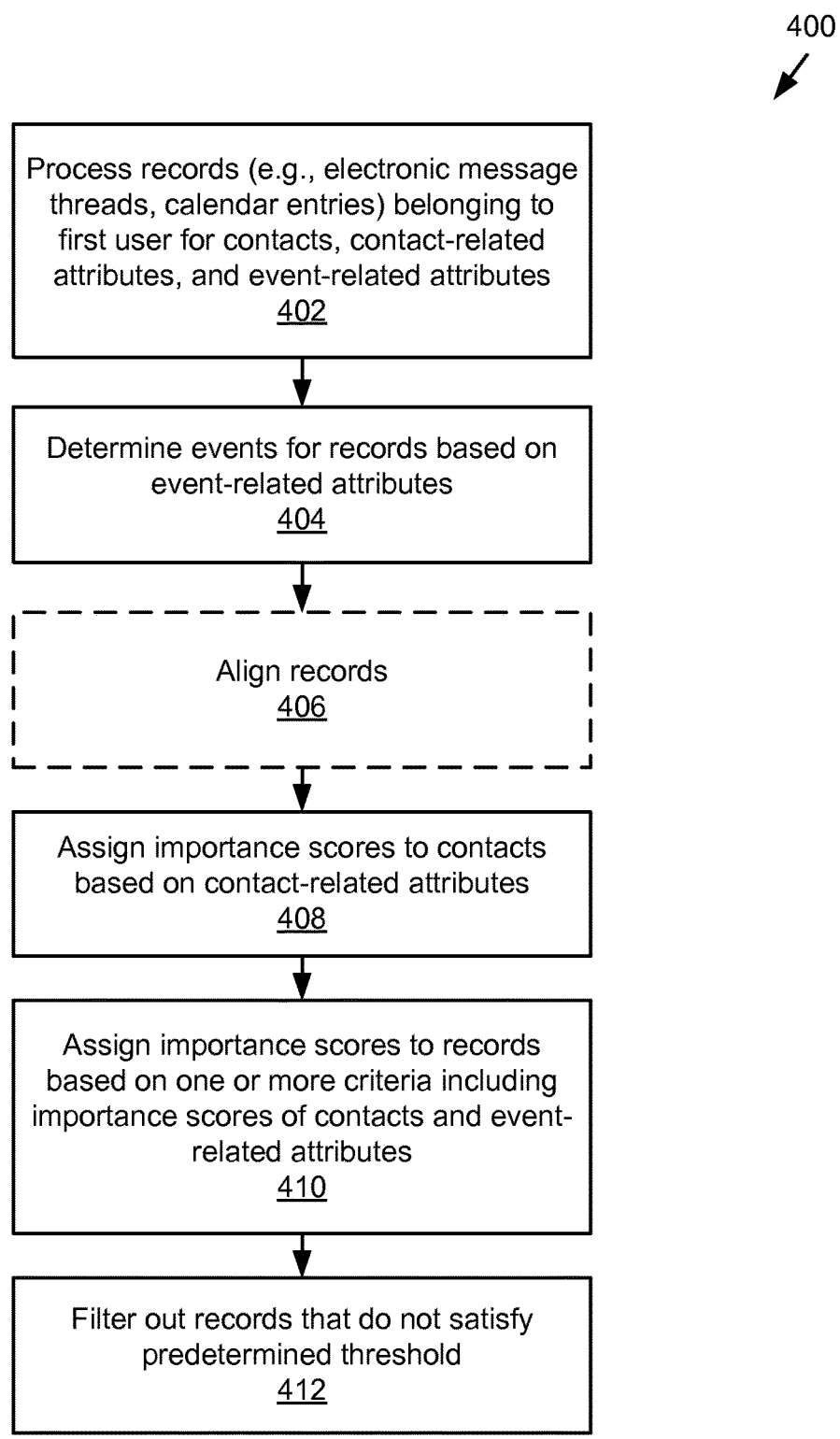
FIG. 4 is a flowchart of an example method for processing and scoring records belonging to a first user.

FIG. 4 is a flowchart of an example method 400 for processing and scoring records (e.g., electronic message threads, calendar entries, etc.) belonging to a first user. The method 400 may begin by processing 402 each of the records (e.g., electronic message threads, calendar entries, etc.) belonging to the first user for contacts, contact-related attributes, and event-related attributes. Next, the method 400 can determine 404 events embodied by the records based on the event-related attributes for those records. For example, event processor 222 can process the event-related attributes of a record for a topic that the record relates to, whether the topic relates to an event that occurred in the user's life or the life of those the user is connected, the date of the event, a description of the event, significant details about the event, other users who attended or knew about the event, etc.

In some implementations, the method 400 may align 406 two or more records with a single event. For example, the method 400 may align one or more calendar entries with one or more electronic message threads that relate to the same event, as determined in block 404. In another example, the method 400 may align two or more message threads, two or more calendar entries, or a combination of the foregoing, which relate to the same event. In some implementations, the event processor 222 can align the two or more records using information that is common between those records. For example, the event processor 222 can match various contacts, contact-related attributes, and event-related attributes of a first record (e.g., calendar entry) with various contacts, contact-related attributes, and event-related attributes of a second record (e.g., a message thread) to determine that the records relate to the same event and then use information from both the first record and the second record when scoring and/or classifying the records as discussed elsewhere herein.

The method 400 may score 408 the contacts associated with each record. In some implementations, the event processor 222 may score each set of contacts that correspond to each of the records by assigning 408 importance scores to sets of contacts. Next, the method 400 may score 410 the records based on one or more criteria. In some implementations, the event processor 222 may score the contacts by assigning importance scores to the records (i.e., the electronic message threads and/or calendar entries) based one or more of the importance scores of the contacts assigned in block 408, the contact-related attributes, and/or the event-related attributes.

Next, the method 400 can filter out 412 records (e.g., electronic message threads, calendar entries, etc.) that have importance scores that do not satisfy a predetermined threshold. In some implementations, the event processor 222 compares the scores corresponding to the records to the threshold and filters out those that are less than the threshold. These unfiltered records can then be classified and processed into event-related posts as discussed elsewhere herein.

Figure 5:
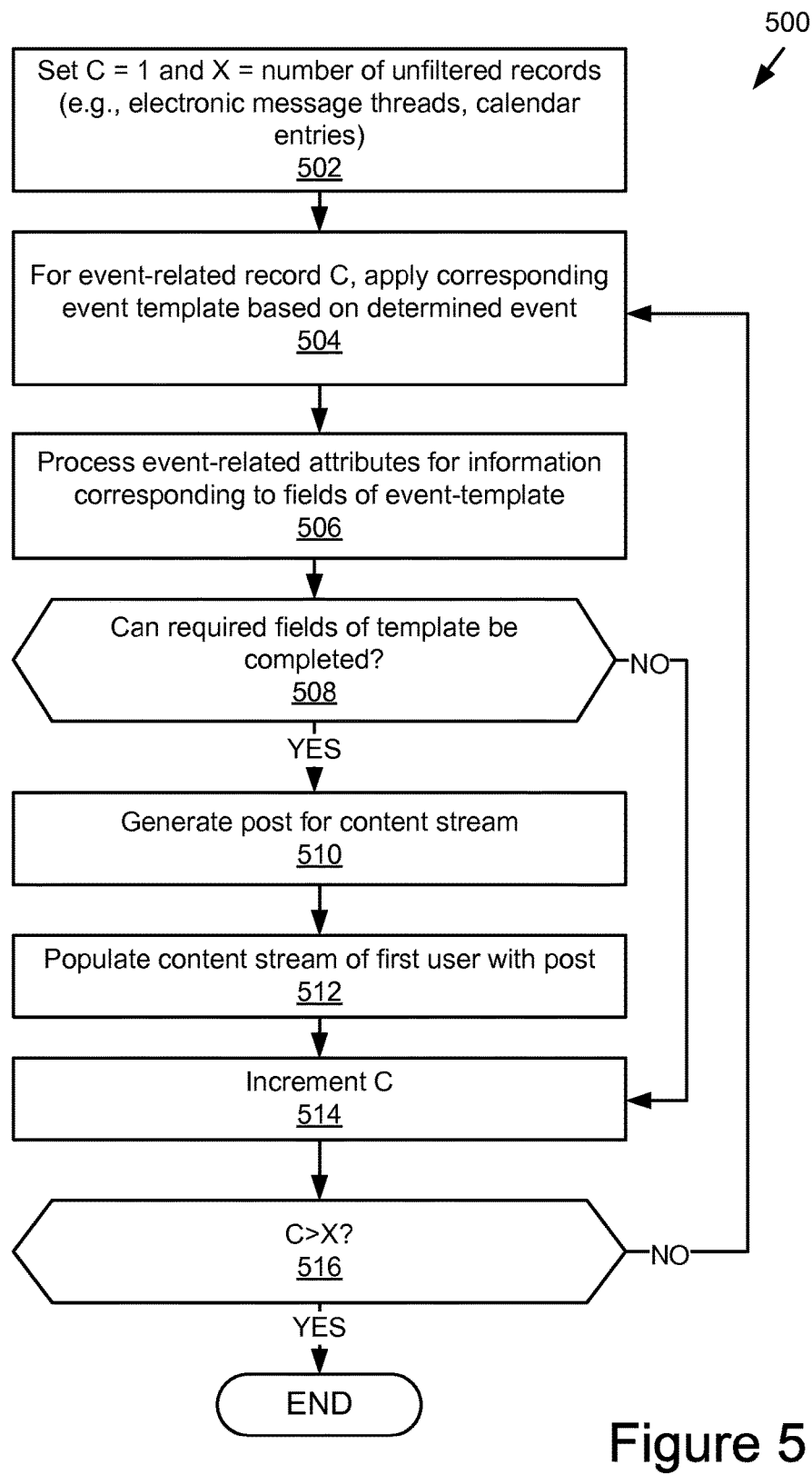
FIG. 5 is a flowchart of an example method for classifying records and generating event-related posts based thereon for a content stream.

FIG. 5 is a flowchart of an example method 500 for classifying records and generating event-related posts based thereon for a content stream. The method 500 may begin by setting 502 the value of counter C to 1 and setting the value of X to the number of unfiltered records (i.e., events). In some implementations, an unfiltered record may include two or more records that have been aligned because they related to the same event, as discussed elsewhere herein.

Next, for record C, the method 500 may classify the event reflected by the record in block 504 by determining what type of event the event is and applying a corresponding event template. By way of example, the event classifier 224 may determine the event of record C to be a wedding and may apply an event template that includes wedding-related fields and content. In some implementations, the event templates may be predetermined for a plurality of different types of events using a learning algorithm, stored in the data store 212 and retrievable by the event classifier 224.

The method 500 continues by processing 506 event-related attributes of the record C for information corresponding to the fields of the applied event template. For example, the event classifier 224 may populate the fields of the event template by matching the event-related attributes to the fields of the template and populating those fields with the attributes that correspond.

Next, the method 500 determines 508 whether the required field(s) of the applied event template can be populated/completed using the event-related attributes of the record C. If the required field(s) cannot be completed, the method 500 increments the counter (and either proceeds to the next record in queue or terminates). For example, the event template may include a required field and the event-related attributes may not include information that matches this field. As a result, the event classifier 224 determines that the record does not include enough information to satisfactorily populate the template and either proceeds to the next record in queue or terminates. If the method 500 determines that the required fields of the template can be completed, the method 500 can generate 510 an event-related post using the populated event template and populate 512 a content stream of a first user with the post. The method 500 then increments 514 the counter and determines 516 if the counter is greater than the number of records to be processed. If so, the method 500 terminates. Otherwise, the method 500 returns to block 504 to process the next record in queue.

In some implementations, the method 500 may populate the content stream with the post as it processes the records or may process each of the records first and then, once all the records X have been processed, the method 500 may populate the content stream with the event-related posts that were generated in block 510.

Figure 6:
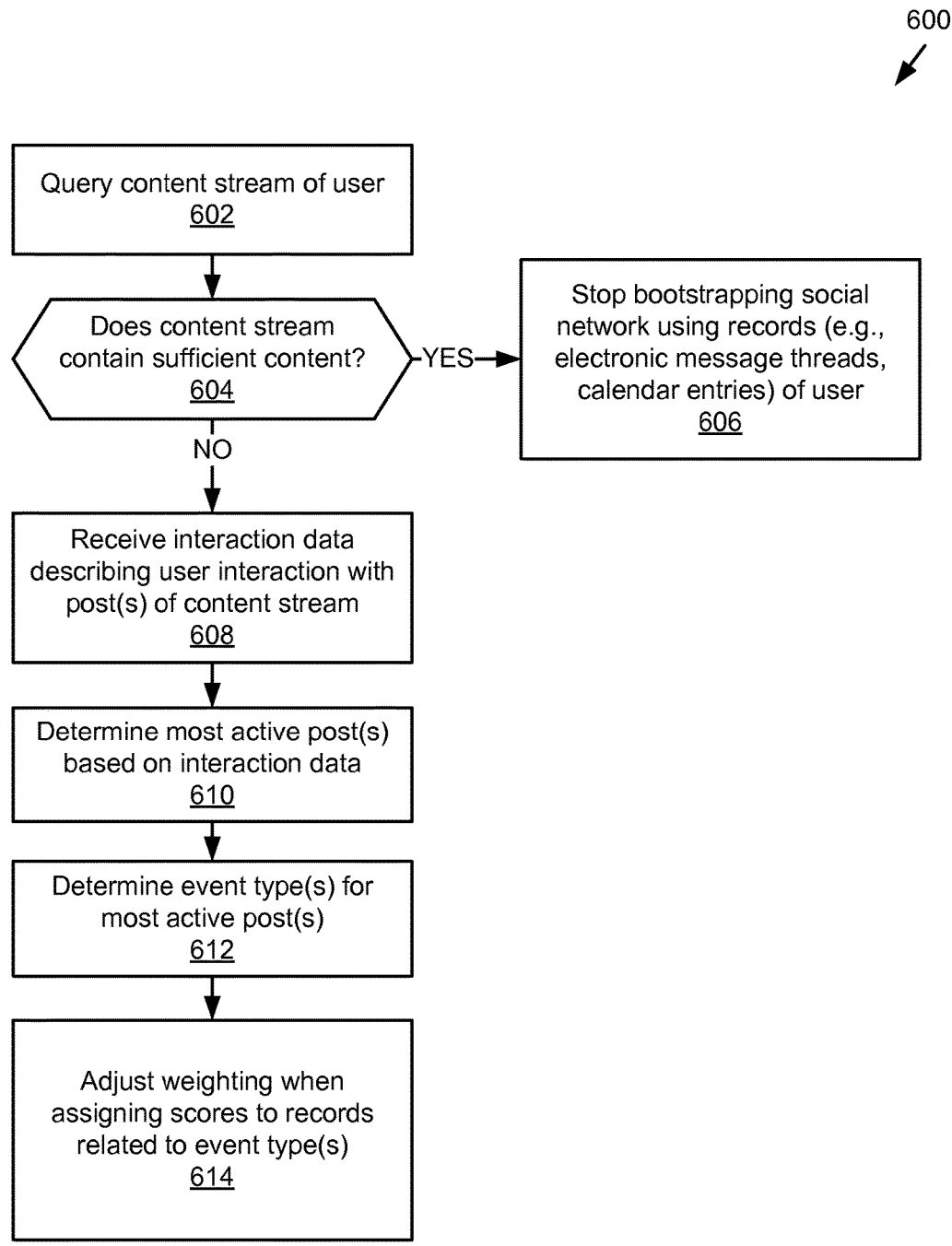
FIG. 6 is a flowchart of an example method for determining whether to bootstrap a social network content stream with event-related posts.

FIG. 6 is a flowchart of an example method 600 for determining whether to bootstrap a social network content stream with event-related posts. As depicted in the FIG. 6, the method 600 begins by querying 602 a content stream of a user and determining 604 whether the content stream of the user includes sufficient content (e.g., posts). For instance, the learning module 228 may query the data store 212 for the number of posts produced by the user and if that number is below a certain threshold, the learning module 228 may proceed to bootstrap the content stream of the user with event-related posts as discussed herein. If the method 600 determines that the content stream of the user has sufficient content (e.g., satisfies the above-noted threshold), then the method 600 can cease 606 to bootstrap the social network using the records (e.g., message threads, calendar entries, etc.) belonging to the user.

In some implementations, the method 600 may cease for a period of time (e.g., a week, month, year, etc.) and then may reinitialize to determine whether the content stream of the user still has sufficient content. In some implementations the threshold may vary based on the density of posts in the user's content stream and any content gaps that may be present. For instance, if the density of posts (e.g., posts per week, month, year, etc.) in the user's content stream is below a certain threshold, the methods 300, 400, 500, 600, and/or 700 may iterate until sufficient content has been inserted into the users content stream to satisfy the density threshold. In some implementations, if significant gaps (e.g., more than two weeks, a month, a half a year, a year, etc., exists between posts or only a small number of posts (e.g., 5, 10, etc.) were posted over a particular time period (e.g., a month, half a year, a year, etc.), the methods 300, 400, 500, 600, and/or 700 may iterate until sufficient content has been inserted into the users content stream to eliminate the gaps (and satisfy the density threshold).

If the method 600 determines 604 that the content stream of the user contains insufficient content, the method 600 may receive 608 interaction data describing user interactions with one or more posts of the content stream (e.g., comments, endorsements, sharing, etc.). In some implementations, the social network application 118 may receive the interaction data and store it in the data store 212 in association with the user, and the learning module 228 may receive the interaction data for the user from the data store (e.g., the data store 212).

Next, the method 600 can determine 610 one or more active posts (i.e., the post(s) from the user's content stream that have been interacted with most (e.g., by the user, the user's friends on the social network, etc.) relative to the other posts in the user's content stream) and can determine 612 the event type(s) that correspond to the active post(s). In some implementations, the learning module 228 can process the content of an active post for an event embodied by the post and then compare the event to the predetermined event types stored in the data store 212 to determine its type.

The method 600 can then continue by adjusting 614 the criteria used to score records. In some implementations, the event processor 222 may modify the scores that are assigned during the processing of a subsequent set of event-related records (e.g., produced in a subsequent iteration) based on the event type(s). For example, the event processor 222 may assign scores to the records of the user based on one or more criteria and the learning module 228 may instruct the event processor 222 to adjust the weighting of these criteria based on the event types determined by it to be the most engaging (as reflected by the interaction data). This is beneficial as it can optimize what content is being used to supplement the user's content stream based on the types of events the user and/or his or her connections on the social network are most likely to engage with.

Figure 7:
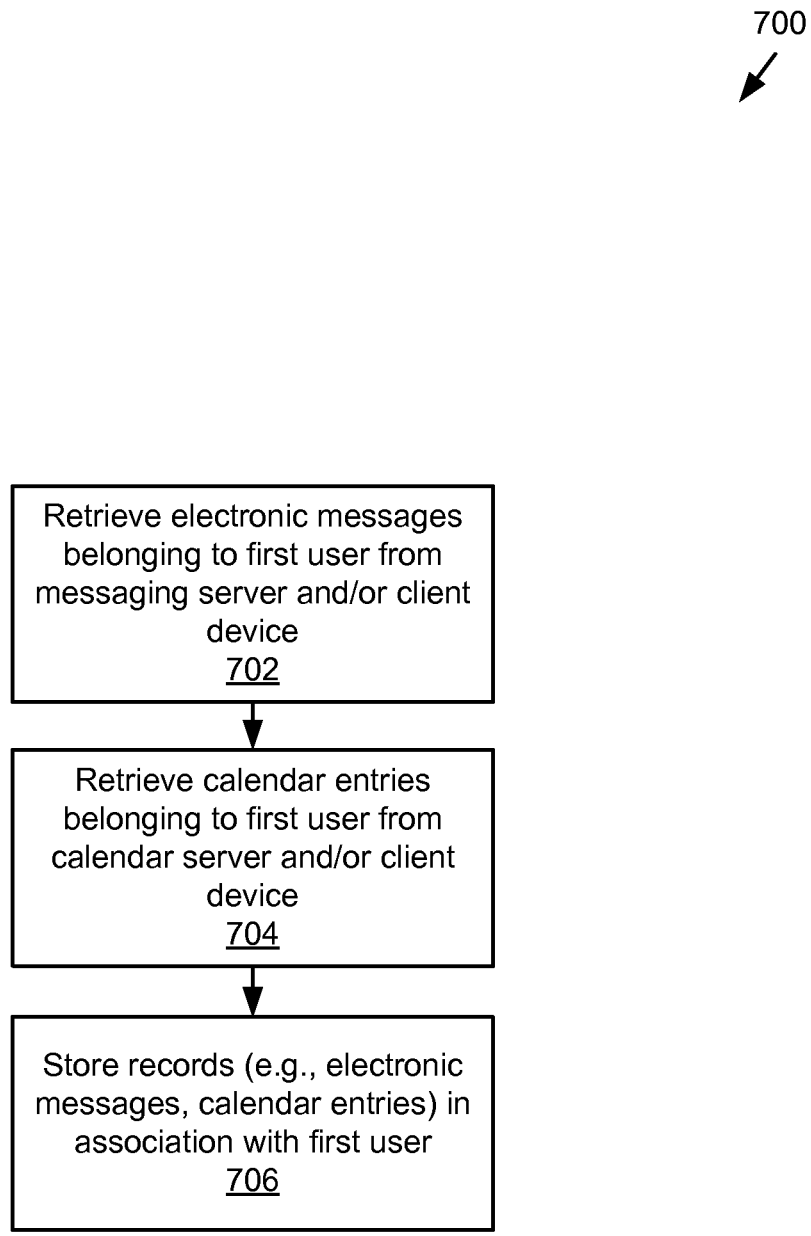
FIG. 7 is a flowchart of an example method for aggregating records.

FIG. 7 is a flowchart of an example method 700 for aggregating event-related records. More particularly, the method 700 aggregates and stores the electronic message threads and/or calendar entries associated with a user in a data store. The method 700 begins by retrieving 702 electronic messages belonging to a first user from a messaging server (e.g., the electronic messaging server 124) and/or a client device (e.g., the client device 106). The method 700 continues by retrieving 704 calendar entries belonging to the first user from a calendar server (e.g., the calendar server 128) and/or the client device. The method 700 may then store 706 the electronic messages and calendar entries retrieved in the blocks 702 and 704, in association with the first user, in a data store (e.g., the data store 212). In some instances, the operations in the blocks 702, 704, and 706 can be performed by the aggregator 220 automatically at regular intervals or may be performed in response to receiving an aggregation request from the social network server 116 as discussed in further detail above with respect to the aggregator 220.

It should be understood that the methods 300-700 are provided by way of example, and numerous variations and/or combinations of these methods, as well as other methods, are contemplated. For example, in some implementations, at least a portion of the methods 300-700 represent various segments of one or more larger methods and may be concatenated or various steps of these methods may be combined or interchanged to produce other methods which are encompassed by the present disclosure. Additionally, it should be understood that the methods 300-700 may be iterative, and thus repeated as many times as necessary to generate sufficient learning data so as to optimize the browser data-based posts being promoted.

Figure 8:
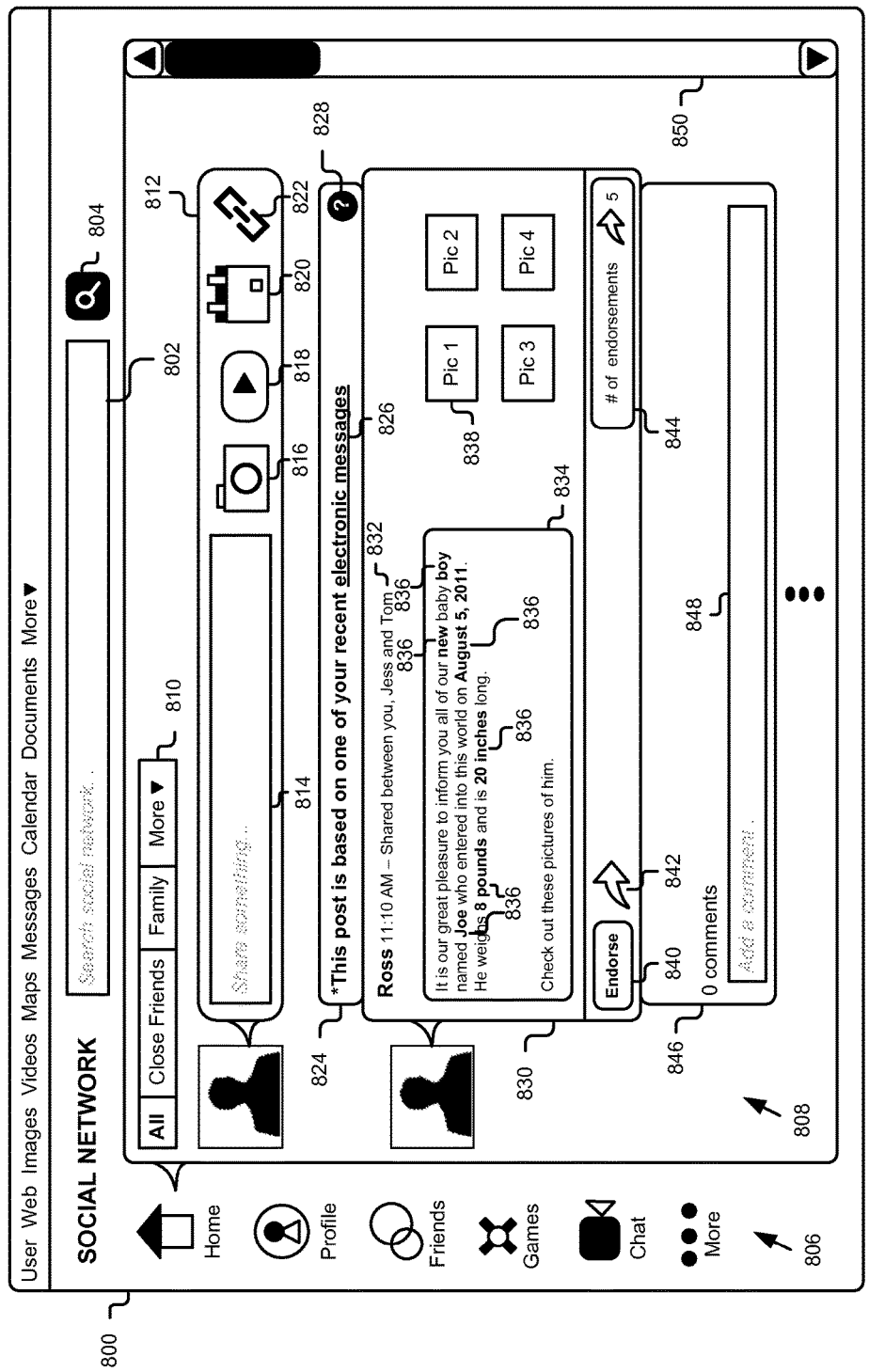
FIG. 8 is a graphic representation of an example user interface for viewing a social network content stream containing event-related posts.

FIG. 8 is a graphic representation of an example user interface 800 for viewing a user content stream containing event-based posts. In the illustrated implementation, the user interface 800 includes a search box 802 for inputting a user query, a search button 804 to submit the user search request, a navigation menu 806 for refreshing the content stream based on content type (as indicated by labels), and an example content stream 808 for displaying one or more posts based on events received from electronic message threads, calendar entries, and/or a combination of both as discussed elsewhere herein.

As depicted in the user interface 800, the example content stream 808 includes a group selector 810 for refreshing the example content stream 808 with posts associated with group selected in the group selector 810, a status bar 812 for posting a status, update, and/or any other information on the content stream 808, an example event-based post 830, and a scroll bar 850. The status bar 812 includes a status box 814 for inputting any textual information which a user wants to post on his/her example content stream 808 with other users, an "add photo" button 816 for posting photos on the example content stream 808, an "add video" button 818 for posting videos on the example content stream 808, an "add event" button 820 for posting events on the example content stream 808, and an "add link" button 822 for posting hyperlinks to various websites, audio files, videos files, blogs, etc. on the content stream 808.

In the depicted implementation, the example event-based post 830 includes a notification bar 824 to notify the user that the content in the example event-based post 830 is based on one of his/her recent electronic messages; a hyperlink 826 to the record (e.g., electronic message thread) from which the example event-based post 830 has been generated; a notification help button 828 for elaborating on the information included in the notification bar 824; metadata 832 for displaying metadata associated with the example post 830, including, for example, sender's name, time at which the post is received, one or more users among which the post is shared, etc.; a content box 834 for displaying the contents of the post; one or more attributes 836 that have been retrieved from the electronic message to fill pre-defined event template for a particular event type; one or more attachments 838 (e.g., photos, videos, audio files, etc.) associated with the electronic message; an endorsement button 840 for liking and/or recommending the example post 830; a sharing button 842 to share the example post 830 with other users on the social network; an activity informer 844 to inform how many users have endorsed and are associated with the example post 830; a comment bar 846 for displaying one or more comments on the example post 830; and a comment box 848 for inputting a comment.

In the depicted implementation, one example event-based post 830 is shown as having been based on event information retrieved from an event-related record. However, it should be understood that any number of event-based posts may be included in the example content stream 808. Further, while the post illustrated in FIG. 8 is based on an electronic message thread, it should be understood that any record type may be used to generate event-based posts for a user on a social network, including, for example, a calendar entry, a user created event on the social network, an alignment of multiple records, etc. It should also be understood that the format of the post 830, and the information displayed in the post 830, is not limited to any specific type or size, and that other variations are contemplated. For instance, the client application 108 may generate user interfaces that are compatible with smaller screen sizes like those included in various handheld mobile devices (e.g., mobile phones). Moreover, the user interfaces rendered by the client application 108 may have a variety of distinct formats, content, positions within the window, and combinations, all of which are encompassed by the scope of the present disclosure.

Technology for bootstrapping a social network using event-related records has been described. In the above description, for purposes of explanation, numerous specific details are set forth in order to provide a thorough understanding of this disclosure. It should be understood, however, that the systems, methods, and computer products described herein can be practiced without these specific details. In other instances, structures and devices are shown in block diagram form in order to avoid obscuring the disclosure. For example, the various components, operations, and/or features are described in some implementations above with reference to user interfaces and particular hardware. However, the present disclosure applies to any type of computing device that can receive data and commands, and any peripheral devices providing services.

Reference in the disclosure to "one implementation," "an implementation," "some implementations," etc., means that a particular feature, structure, or characteristic described in connection with the implementation is included in at least one implementation. The appearances of the phrase "in one implementation" or "in some implementations" in various places in the disclosure are not necessarily all referring to the same implementation(s).

Some portions of the detailed descriptions above are presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms including, for example, "processing" or "computing" or "calculating" or "defining" or "identifying" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In a preferred implementation, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

The foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the present disclosure is in no way limited to implementation in any specific programming language, or for any specific operating system or environment. Accordingly, the present disclosure is intended to be illustrative, but not limiting, of the subject matter set forth in the following claims.

What is claimed is:

1. A computer-implemented method comprising:
   receiving event-related data including at least one event-related record belonging to a first user;
   determining an importance score of the event-related record based on a level of user engagement with the event-related record;
   determining whether the importance score of the event-related record satisfies an importance threshold;
   processing the event-related record to determine an event;
   classifying the event with an event type using a plurality of predefined event types;
   determining whether a content stream of the first user has insufficient content by comparing a density of posts included in the content stream of the first user with a threshold density;
   responsive to a determination that the content stream of the first user has insufficient content and a determination that the importance score of the event-related record satisfies the importance threshold, automatically generating a post for the event based on the event type; and
   populating the content stream of the first user on an online service with the post for display, the post including a notification notifying that the post has been automatically generated based on the event-related data.

2. The computer-implemented method of claim 1, wherein processing the event-related record includes processing the event-related record for event-related attributes that correspond to the event and classifying the event into an event type includes:
   applying an event template associated with the event type, the event template including one or more required fields;
   processing the event-related attributes for information corresponding to the one or more required fields; and
   generating the post for the event based on the event template and the information.

3. The computer-implemented method of claim 1, wherein the at least one record includes an electronic message thread and a calendar entry, the electronic message thread and the calendar entry are aligned based on a similarity, and processing the event-related record includes processing the electronic message thread and the calendar entry to determine the event.

4. The computer-implemented method of claim 1, wherein the at least one record includes an electronic message-thread or calendar entry belonging to the first user.

5. The computer-implemented method of claim 1, wherein:
   the event-related data includes a plurality of event-related records;
   processing the event-related data includes assigning scores to the event-related records based on one or more criteria and filtering out one or more of the event-related records having scores that do not satisfy a predetermined threshold;
   classifying the event includes classifying one or more events of the one or more event-related records that are unfiltered by the filtering;
   generating the post includes generating one or more posts based on the one or more event-related records; and
   populating the content stream includes populating the content stream with the one or more posts.

6. The computer-implemented method of claim 5, further comprising:
   receiving interaction data reflecting an interaction by the first user or another user with a post of the content stream;
   determining an event type corresponding to the post of the content stream; and
   modifying scores that are assigned during the processing of a subsequent set of event-related records based on the event type.

7. The computer-implemented method of claim 5, wherein processing the event-related records further includes:
   processing sets of contacts, sets of contact-related attributes, and sets of event-related attributes from the event-related records;
   assigning first importance scores to the sets of contacts based on the sets of contact-related attributes that respectively correspond to the sets of contacts;
   assigning second importance scores to the event-related records based on one or more criteria including the first importance scores and the sets of event-related attributes corresponding to the event-related records;
   filtering out one or more event-related records having second importance scores less than the predetermined threshold; and
   determining one or more events based on one or more sets of event-related attributes corresponding to one or more event-related records that are unfiltered by the filtering.

8. A computer program product comprising a non-transitory computer usable medium including a computer readable program, wherein the computer readable program, when executed on a computer, causes the computer to:
   receive event-related data including at least one event-related record belonging to a first user;
   determine an importance score of the event-related record based on a level of user engagement with the event-related record;
   determine whether the importance score of the event-related record satisfies an importance threshold;
   process the event-related record to determine an event;
   classify the event with an event type using a plurality of predefined event types;

determine whether a content stream of the first user has insufficient content by comparing a density of posts included in the content stream of the first user with a threshold density;

responsive to a determination that the content stream of the first user has insufficient content and a determination that the importance score of the event-related record satisfies the importance threshold, automatically generate a post for the event based on the event type; and populate the content stream of the first user on an online service with the post for display, the post including a notification notifying that the post has been automatically generated based on the event-related data.

9. The computer program product of claim 8, wherein to process the event-related data includes processing the event-related record for event-related attributes that correspond to the event and to classify the event into an event type includes:

applying an event template associated with the event type, the event template including one or more required fields;

processing the event-related attributes for information corresponding to the one or more required fields; and generating the post for the event based on the event template and the information.

10. The computer program product of claim 8, wherein the at least one record includes an electronic message thread and a calendar entry, the electronic message thread and the calendar entry are aligned based on a similarity, and to process the event-related record includes processing the electronic message thread and the calendar entry to determine the event.

11. The computer program product of claim 8, wherein the at least one record includes an electronic message-thread or calendar entry belonging to the first user.

12. The computer program product of claim 8, wherein:
the event-related data includes a plurality of event-related records;
to process the event-related data includes assigning scores to the event-related records based on one or more criteria and filtering out one or more of the event-related records having scores that do not satisfy a predetermined threshold;
to classify the event includes classifying one or more events of the one or more event-related records that are unfiltered by the filtering;
to generate the post includes generating one or more posts based on the one or more event-related records; and
to populate the content stream includes populating the content stream with the one or more posts.

13. The computer program product of claim 12, wherein the computer readable program, when executed on the computer, further causes the computer to:
receive interaction data reflecting an interaction by the first user or another user with a post of the content stream;
determine an event type corresponding to the post of the content stream; and
modify scores that are assigned during the processing of a subsequent set of event-related records based on the event type.

14. The computer program product of claim 12, wherein to process the event-related records further includes:
processing sets of contacts, sets of contact-related attributes, and sets of event-related attributes from the event-related records;
assigning first importance scores to the sets of contacts based on the sets of contact-related attributes that respectively correspond to the sets of contacts;
assigning second importance scores to the event-related records based on one or more criteria including the first importance scores and the sets of event-related attributes corresponding to the event-related records;
filtering out one or more event-related records having second importance scores less than the predetermined threshold; and
determining one or more events based on one or more sets of event-related attributes corresponding to one or more event-related records that are unfiltered by the filtering.

15. A system comprising:
a processor; and
a memory storing instructions that, when executed, cause the system to:
receive event-related data including at least one event-related record belonging to a first user;
determine an importance score of the event-related record based on a level of user engagement with the event-related record;
determine whether the importance score of the event-related record satisfies an importance threshold;
process the event-related record to determine an event;
classify the event with an event type using a plurality of predefined event types;
determine whether a content stream of the first user has insufficient content by comparing a density of posts included in the content stream of the first user with a threshold density;
responsive to a determination that the content stream of the first user has insufficient content and a determination that the importance score of the event-related record satisfies the importance threshold, automatically generate a post for the event based on the event type; and
populate the content stream of the first user on an online service with the post for display, the post including a notification notifying that the post has been automatically generated based on the event-related data.

16. The system of claim 15, wherein to process the event-related data includes processing the event-related record for event-related attributes that correspond to the event and to classify the event into an event type includes:
applying an event template associated with the event type, the event template including one or more required fields;
processing the event-related attributes for information corresponding to the one or more required fields; and
generating the post for the event based on the event template and the information.

17. The system of claim 15, wherein the at least one record includes an electronic message thread and a calendar entry, the electronic message thread and the calendar entry are aligned based on a similarity, and to process the event-related record includes processing the electronic message thread and the calendar entry to determine the event.

18. The system of claim 15, wherein the at least one record includes an electronic message-thread or calendar entry belonging to the first user.

19. The system of claim 15, wherein:
the event-related data includes a plurality of event-related records;
to process the event-related data includes assigning scores to the event-related records based on one or more criteria and filtering out one or more of the event-related records having scores that do not satisfy a predetermined threshold;
to classify the event includes classifying one or more events of the one or more event-related records that are unfiltered by the filtering;
to generate the post includes generating one or more posts based on the one or more event-related records; and
to populate the content stream includes populating the content stream with the one or more posts.

20. The system of claim 19, wherein the instructions, when executed, further cause the system to:
receive interaction data reflecting an interaction by the first user or another user with a post of the content stream;
determine an event type corresponding to the post of the content stream; and
modify scores that are assigned during the processing of a subsequent set of event-related records based on the event type.

21. The system of claim 19, wherein to process the event-related records further includes:
processing sets of contacts, sets of contact-related attributes, and sets of event-related attributes from the event-related records;
assigning first importance scores to the sets of contacts based on the sets of contact-related attributes that respectively correspond to the sets of contacts;
assigning second importance scores to the event-related records based on one or more criteria including the first importance scores and the sets of event-related attributes corresponding to the event-related records;
filtering out one or more event-related records having second importance scores less than the predetermined threshold; and
determining one or more events based on one or more sets of event-related attributes corresponding to one or more event-related records that are unfiltered by the filtering.

* * * * *